United States Patent
Soehren et al.

(10) Patent No.: US 7,305,303 B2
(45) Date of Patent: Dec. 4, 2007

(54) PERSONAL NAVIGATION USING TERRAIN-CORRELATION AND/OR SIGNAL-OF-OPPORTUNITY INFORMATION

(75) Inventors: Wayne A. Soehren, Wayzata, MN (US); Charles T. Bye, Eden Prairie, MN (US); Wesley J. Hawkinson, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 165 days.

(21) Appl. No.: 11/066,513

(22) Filed: Feb. 25, 2005

(65) Prior Publication Data
US 2005/0197769 A1    Sep. 8, 2005

Related U.S. Application Data

(60) Provisional application No. 60/549,713, filed on Mar. 2, 2004.

(51) Int. Cl.
G01C 21/16    (2006.01)
G01C 21/00    (2006.01)

(52) U.S. Cl. .................. 701/221; 701/220; 701/213; 342/357.06; 342/357.14

(58) Field of Classification Search .................. None
See application file for complete search history.

(56) References Cited

U.S. PATENT DOCUMENTS

| | | | |
|---|---|---|---|
| 4,584,646 A * | 4/1986 | Chan et al. ................. 701/207 |
| 4,829,304 A | 5/1989 | Baird |
| 5,646,857 A * | 7/1997 | McBurney et al. .......... 701/213 |
| 5,774,829 A * | 6/1998 | Cisneros et al. ............ 701/213 |
| 5,912,643 A | 6/1999 | Chew et al. |
| 6,032,108 A | 2/2000 | Seiple et al. |
| 6,218,980 B1 | 4/2001 | Goebel et al. |
| 6,246,960 B1 * | 6/2001 | Lin ............................ 701/214 |
| 6,415,223 B1 * | 7/2002 | Lin et al. .................... 701/208 |
| 6,459,990 B1 * | 10/2002 | McCall et al. .............. 701/220 |
| 6,512,976 B1 | 1/2003 | Sabatino et al. |
| 6,522,266 B1 | 2/2003 | Soehren et al. |
| 6,826,477 B2 * | 11/2004 | Ladetto et al. .............. 701/217 |
| 6,882,308 B2 * | 4/2005 | Farine et al. ............ 342/357.12 |
| 2003/0114980 A1 | 6/2003 | Klausner et al. |
| 2003/0182077 A1 * | 9/2003 | Emord ........................ 702/150 |
| 2006/0089786 A1 | 4/2006 | Soehren |

FOREIGN PATENT DOCUMENTS

| GB | 2325975 | 9/1998 |
|---|---|---|
| WO | 03078929 | 9/2003 |

OTHER PUBLICATIONS

Margaria, "Biomechanics and Energetics of Muscular Exercise", 1976, pp. 107-124, Publisher: Oxford University Press, Published in: Oxford, United Kingdom.
Karnick, "Low Cost Inertial Measuring Unit", 1992, pp. 422-425, Publisher: IEEE, Published in: US.

* cited by examiner

Primary Examiner—Michael J. Zanelli
(74) Attorney, Agent, or Firm—Fogg & Powers LLC

(57) ABSTRACT

A navigation system includes an inertial navigation unit. The navigation system also includes a Kalman filter that generates corrective feedback for use by the inertial navigation unit. The Kalman filter generates the corrective feedback as a function of at least one of GPS/DGPS information, sensor information, user input, terrain correlation information, signal-of-opportunity information, and/or position information output by a motion classifier.

17 Claims, 2 Drawing Sheets

PERSONAL NAVIGATION USING TERRAIN-CORRELATION AND/OR SIGNAL-OF-OPPORTUNITY INFORMATION

CROSS REFERENCE TO RELATED APPLICATIONS

This application claims the benefit of U.S. Provisional Application No. 60/549,713, filed Mar. 2, 2004, which is incorporated herein by reference.

TECHNICAL FIELD

The following description relates to navigation systems in general and personal navigation systems in particular.

BACKGROUND

Navigation systems and techniques are typically used to provide information indicative of position and/or movement. In one navigation system (also referred to here as a "personal navigation system"), the position and/or movement of a human is monitored using an inertial navigation system (INS) that is mounted to the human. In such a personal navigation system, corrective feedback is generated by a Kalman filter using a distance-traveled estimate generated using a motion classifier and/or a position estimate generated using one or more radio frequency (RF) navigation aids (for example, aids that employ global positioning system (GPS) technology). The corrective feedback is used to refine, for example, the processing performed by the INS and/or by the motion classifier. In particular, the use of RF navigation aids helps to reduce the growth of navigation errors. However, such RF navigation aids may not be available in all environments (for example, GPS receivers require an unobstructed view of the sky and are susceptible to jamming).

SUMMARY

In one embodiment, a navigation system comprises a plurality of sensors. Each sensor outputs sensor information. The plurality of sensors comprises an altitude sensor. The sensor information output by the altitude sensor comprises altitude information. The navigation system further comprises an inertial navigation unit communicatively coupled to at least one of the plurality of sensors to generate a navigation solution based on at least a portion of the sensor information. The navigation system further comprises a motion classifier communicatively coupled to at least one of the plurality of sensors. The motion classifier generates position information based on at least a portion of the sensor information. The navigation system further comprises a terrain correlator communicatively coupled to the altitude sensor. The terrain correlator generates terrain-correlation information based on the altitude information. The navigation system further comprises a Kalman filter communicatively coupled to the inertial navigation unit and the motion classifier. The Kalman filter generates corrective feedback as a function of the navigation solution and, when available, at least one of the following: at least a portion of the sensor information and the position information. The corrective feedback is used by the inertial navigation unit to generate the navigation solution.

In another embodiment, a navigation system comprises a plurality of sensors. Each sensor outputs sensor information. The plurality of sensors comprises an altitude sensor. The sensor information output by the altitude sensor comprises altitude information. The navigation system further comprises an inertial navigation unit communicatively coupled to at least one of the plurality of sensors to generate a navigation solution based on at least a portion of the sensor information. The navigation system further comprises a motion classifier communicatively coupled to at least one of the plurality of sensors. The motion classifier generates position information based on at least a portion of the sensor information. The navigation system further comprises a terrain correlator communicatively coupled to the altitude sensor. The terrain correlator generates terrain-correlation information based on the altitude information. The navigation system further comprises a Kalman filter communicatively coupled to the inertial navigation unit, the motion classifier, and the terrain correlator. The Kalman filter generates corrective feedback as a function of the navigation solution and, when available, at least one of the following: at least a portion of the sensor information, the position information, and the terrain-correlation information. The corrective feedback is used by the inertial navigation unit to generate the navigation solution.

In another embodiment, a navigation system comprises a plurality of sensors. Each sensor outputs sensor information. The plurality of sensors comprises an altitude sensor and the sensor information output by the altitude sensor comprises altitude information. The navigation system further comprises an inertial navigation unit communicatively coupled to at least one of the plurality of sensors to generate a navigation solution based on at least a portion of the sensor information. The navigation system further comprises a motion classifier communicatively coupled to at least one of the plurality of sensors. The motion classifier generates position information based on at least a portion of the sensor information. The navigation system further comprises a signal-of-opportunity interface to receive at least one signal of opportunity and to generate signal-of-opportunity information based on the signal of opportunity. The navigation system further comprises a Kalman filter communicatively coupled to the inertial navigation unit, the motion classifier, and the signal-of-opportunity interface. The Kalman filter generates corrective feedback as a function of the navigation solution and, when available, at least one of the following: at least a portion of the sensor information, the position information output, and the signal-of-opportunity information. The corrective feedback is used by the inertial navigation unit to generate the navigation solution.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
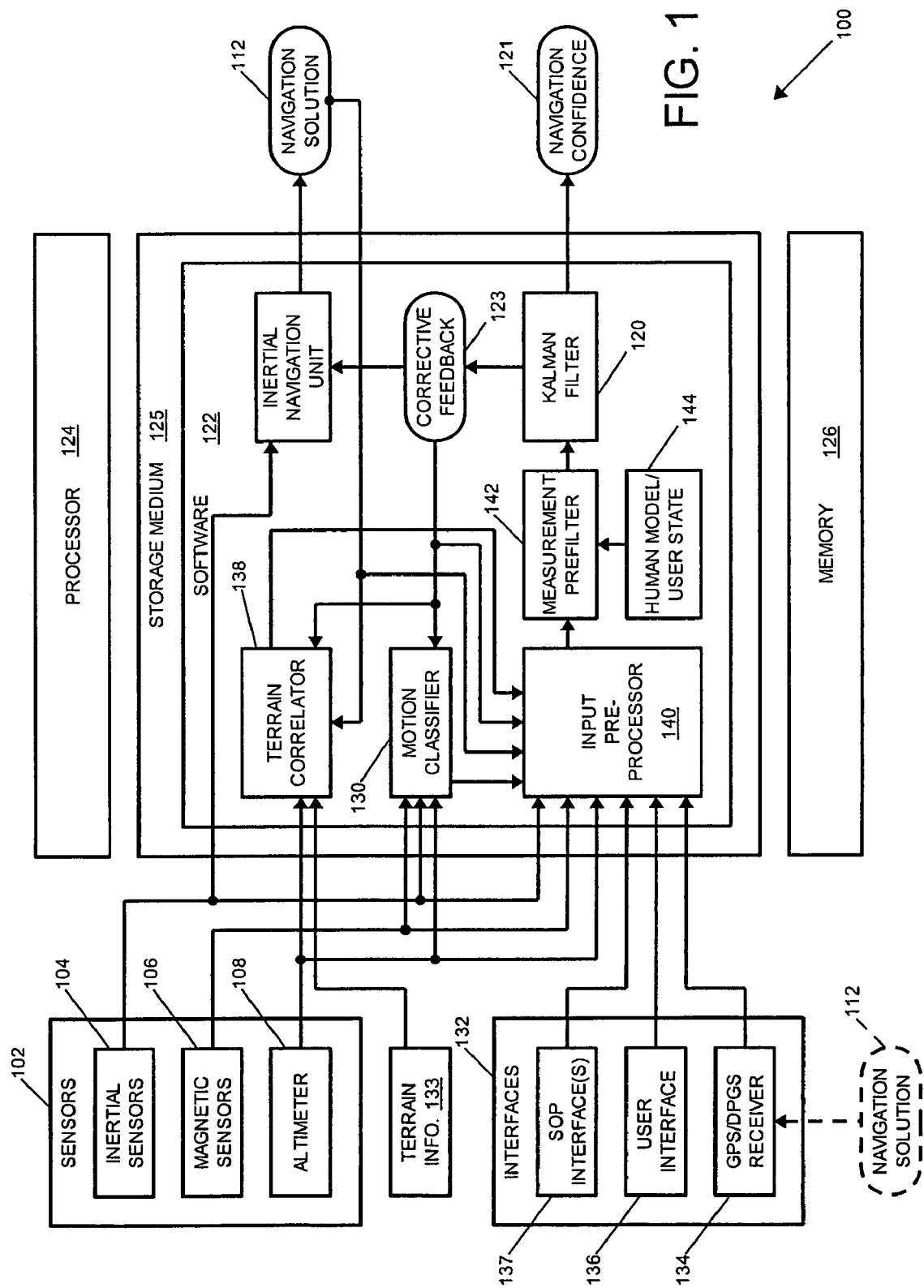
FIG. 1 is a block diagram of one embodiment of a navigation system.

FIG. 1 is a block diagram of one embodiment of a navigation system 100. In the particular embodiment shown in FIG. 1, the navigation system 100 is implemented as a personal navigation system for mounting to a human. In other embodiments, the navigation system 100 is implemented in other ways and/or for other applications.

The navigation system 100 comprises one or more sensors 102. The sensors 102 generate information (for example, in the form of one or more analog signals or one or more digital data streams) that is indicative of one or physical attributes associated with the navigation system 100 (for example, information indicative of a position and/or movement of the navigation system 100). In the embodiment shown in FIG. 1, the sensors 102 include one or more inertial sensors 104, one or more magnetic sensors 106, and/or one or more altimeters 108 (or other barometric pressure sensor). In one implementation of such an embodiment, one or more of the sensors 102 are implemented using micro-electro-mechanical systems (MEMS) sensors. In other embodiments and implementations, the sensors 102 comprise one or more additional or alternate sensors (for example, one or more vision sensors).

The system 100 further comprises an inertial navigation unit 110. In the embodiment shown in FIG. 1, the inertial navigation unit 110 is implemented (at least in part) in software 122. The software 122 is executed by at least one programmable processor 124 (for example, at least one microprocessor). The software 122 comprises a set of program instructions embodied on a storage medium 125 from which at least a portion of the program instructions are read by the programmable processor 124 for execution thereby. The program instructions, when executed by the programmable processor 124, carry out at least a portion of the functionality described here as being performed by the inertial navigation unit 110. In such an embodiment, the processor 124 includes or is communicatively coupled to a memory 126 (for example, any suitable form of volatile memory and/or non-volatile memory) for storing such program instructions and/or data structures used during execution of the software 122.

The inertial navigation unit 110 generates a navigation solution 112 from signals output by the inertial sensors 104. The navigation solution 112 comprises a position, velocity, and attitude estimate, in one embodiment. For example, in one implementation of such an embodiment, the inertial sensors 104 include an arrangement of three accelerometers and three gyroscopes that are used to generate such a position estimate. Accelerometers are inertial sensors 104 that sense a linear change in rate (that is, acceleration) along a given axis. Gyroscopes are inertial sensors 104 that sense angular rate (that is, rotational velocity). In such an implementation, the three accelerometers are oriented around three mutually orthogonal axes (for example, the x, y, and z axes) and the three gyroscopes are oriented around three mutually orthogonal axes (for example, pitch, yaw, and roll axes). The outputs of the accelerometers and the gyroscopes are processed by the inertial navigation unit 110. For example, the three orthogonal outputs of the accelerometers are vectorily summed by the inertial navigation unit 110 to obtain an acceleration vector for the navigation system 100. The inertial navigation unit 110 integrates the acceleration vector to obtain a velocity vector for the navigation system 100 and then integrates the velocity vector to obtain a position change vector for the navigation system 100. The three orthogonal outputs of the gyroscopes are vectorily summed by the inertial navigation unit 110 to obtain a rotational velocity vector for the navigation system 100. The inertial navigation unit 110 integrates the rotational velocity vector to obtain the attitude change vector of the navigational system 100. The position change vector and the attitude change vector are used to generate the position estimate.

The system 100 further comprises a Kalman filter 120. In the embodiment shown in FIG. 1, the Kalman filter 120 is implemented as a part of the software 122 executed by the programmable processor 124. The Kalman filter 120 receives the navigation solution 112 (for example, a position, velocity, and attitude estimate) output by the inertial navigation unit 110 and generates information indicative of the confidence of the navigation solution 112 output by the inertial navigation unit 110 (also referred to here as the "navigation confidence" 121). In the embodiment shown in FIG. 1, the Kalman filter 120 also generates corrective feedback 123. In one implementation of such an embodiment, the navigation solution 112 and the navigation confidence 121 (or information derived therefrom) are displayed or otherwise provided to a user of the system 100 (for example, using a user interface 136 described below). The corrective feedback 123 is used by other components of the system 100 as feedback for the processing performed by the respective components. For example, in the embodiment shown in FIG. 1, the corrective feedback 123 is provided to the inertial navigation unit 110 for use by the inertial navigation unit 110 to control navigation error growth. One exemplary implementation of such an embodiment is described in U.S. Pat. No. 6,522,266, entitled "Navigation System, Method and Software for Foot Travel," (referred to here as the "'266 Patent"). The '266 Patent is incorporated herein by reference.

In the embodiment shown in FIG. 1, one input that is supplied to the Kalman filter 120 is a distance-traveled estimate that is output by a motion classifier 130. In the embodiment shown in FIG. 1, the motion classifier 130 is implemented as a part of the software 122 executed by the programmable processor 124. The motion classifier 130 implements an algorithm that models step distance (also referred to here as a "step model"). For example, in one implementation of such an embodiment, a linear relationship between step size and walking speed (tailored to a particular user) is used. One example of such a linear relationship is found in Biomechanics and Energetics of Muscular Exercise, by Rodolfo Margaria (Chapter 3, pages 107–124. Oxford: Clarendon Press 1976).

In the embodiment shown in FIG. 1, the motion classifier 130 uses signals output by the magnetic sensors 106, the altimeter 108, and one or more of the inertial sensors 104 to estimate step frequency and direction. For example, in one implementation of such an embodiment, the magnetic sensors 106 comprise three magnetic sensors 106 are oriented around three mutually orthogonal axes (the x, y, and z axes). Distance traveled and direction of travel are determined using both step frequency (that is, the number of steps per unit of time) along with the heading (that is, direction) of the steps. The motion classifier 130 takes the estimated step length, the step frequency, and the motion direction for the steps (derived from the navigation output or directly from the magnetometer) and calculates a distance-traveled estimate. Also, in the embodiment shown in FIG. 1, the motion classifier 130 uses corrective feedback 123 generated by the Kalman filter 120 in generating the distance-traveled estimate. One implementation of such an embodiment is described in the '266 Patent. In other embodiments, the motion classifier 130 is implemented in other ways (for example, using additional or alternate inputs for the processing performed by the motion classifier 130).

The system 100 further comprises one or more interfaces 132 by which one or more respective signals (or information) are received (or otherwise provided to) the Kalman filter 120. In the embodiment shown in FIG. 1, the interfaces 132 comprise a GPS/differential GPS (DGPS) receiver 134. The GPS/DGPS receiver 134 receives a GPS RF signal from one or more GPS satellites and outputs information derived from the received GPS RF signals to the Kalman filter 120 for use in the processing performed by the Kalman filter 120 (for example, in generating the navigation confidence 121 and the corrective feedback 123). In one implementation of such an embodiment, the GPS/DGPS receiver 134 and the inertial navigation unit 110 (and the Kalman filter 120) are integrated using "loosely coupled" integration. In such an implementation, the GPS/DGPS receiver 134 outputs time and three-dimensional position and velocity information to the Kalman filter 120 for use by the Kalman filter 120 in generating the navigation confidence 121 and the corrective feedback 123. In such an implementation, when the GPS/DGPS receiver 134 is unable to receive the four necessary GPS RF signals to generate the three-dimensional position, velocity, and time information (for example, because of jamming or because of an obstructed view of the sky), the GPS/DGPS receiver 134 does not output three-dimensional position, velocity, and time information for use by the Kalman filter 120.

In another implementation of the embodiment shown in FIG. 1 (illustrated in FIG. 1 using dashed lines), the GPS/DGPS receiver 134 and the inertial navigation unit 110 (and the Kalman filter 120) are integrated using "tightly coupled" integration. In such an implementation, the GPS/DGPS receiver 134 outputs (in addition to or instead of three-dimensional position, velocity, and time information, if available) information about one or more GPS measurement observables (such as pseudorange, carrier phase and/or Doppler shift) for each GPS RF signal the receiver 134 receives. For example, if the GPS/DGPS receiver 134, at a given point in time, is able to receive less than the four GPS RF signals necessary to generate the three-dimensional position, velocity, and time information, the GPS/DGPS receiver 134 still outputs to the Kalman filter 120 the GPS observables information for those GPS RF signals the receiver 134 is able to receive. Also, if the GPS/DGPS receiver 134, at a given point in time, is able to receive more than the four GPS RF signals necessary to generate the three-dimensional position, velocity, and time information, the GPS/DGPS receiver 134 still outputs to the Kalman filter 120 the GPS observables information for all the GPS RF signals the receiver 134 is able to receive. In such an implementation, the navigation solution 112 can also be input to the GPS/DGPS receiver 134 for use as feedback by the GPS/DGPS receiver 134. In another embodiment (shown in FIG. 2 below), the GPS/DGPS receiver 134 and the inertial navigation unit 110 (and the Kalman filter 120) are integrated using "ultra-tightly coupled" integration.

In the embodiment shown in FIG. 1, the interfaces 132 further comprise a user interface 136 for receiving input from a user of the system 100 and/or for displaying (or otherwise providing) output for or to the user. In one implementation of such an embodiment, the user interface 136 comprises one or more buttons or keys (for example, in the form of a keypad) that the user presses in order to input information to the system 100 and a display (for example, an alpha-numeric liquid crystal display on which information is output for the user to view). In other implementations, the user interface 136 is implemented in other ways. For example, in one alternative implementation, the user interface 136 comprises a device interface (for example, a universal serial bus (USB) or wireless interface (for example, a BLUETOOTH or IEEE 802.11 (or other wireless protocol) interface) for communicatively coupling (directly or indirectly) the system 100 to an input device and/or output device external to the system 100. One such exemplary implementation is described in co-pending U.S. patent application Ser. No. 10/973,503, filed Oct. 26, 2004, entitled "Personal Navigation Device For Use With Portable Device," (referred to here as the "'503 Application"). The '503 Application is incorporated herein by reference.

In the embodiment shown in FIG. 1, a user of the system 100 uses the user interface 136 to input initial location information (for example, an absolute position of a known starting position of the system 100 at a given point in time) and, thereafter, one or more items of "landmark" information (for example, an identifier associated with a particular geographic landmark). In such an embodiment, such initial location information and landmark information is provided to the Kalman filter 120 for use in generating the corrective feedback.

The interfaces 132, in the embodiment shown in FIG. 1, further comprise one or more signal-of-opportunity (SOP) interfaces 137. In such an embodiment, each SOP interface 137 comprises a receiver adapted to receive one or more RF signals that are transmitted (or otherwise radiated) for a purpose other than navigation (also referred to here as "signals of opportunity"). Examples of signals of opportunity include, without limitation, cellular telephone and data signals, broadcast television signals, broadcast radio signals, wireless data communications (for example, BLUETOOTH, IEEE 802.11 or IEEE 802.16 networking communications), and RF "interference" signatures or profiles. Each such SOP interface 137 also comprises appropriate components to take measurements from (or otherwise process) the received signals of opportunity in order to derive navigation-related information. Examples of such measurements and/or processing include, without limitation, time difference of arrival (TDOA), time of arrival (TOA), and signal-strength measurements and triangulation, identification (for example, signal source, type or content), signature identification, profiling, pattern matching, landmarking and bearing processing.

In other implementations, at least one of the SOP interfaces 136 comprises a transmitter and receiver for engaging in two-way communications in order to receive or otherwise derive navigation-related information from a signal of opportunity. For example, in one such implementation, a SOP interface 137 transmits a "beacon" signal that is received by one or more receivers external to the system 100 and equipment communicatively coupled to the external receivers, for example, triangulates the location of the system 100 and transmits position information back to the system 100 for reception by the SOP interface 137. In another implementation, a SOP interface 137 transmits a "loopback" signal to a transceiver external to the system 100 that transmits the received signal back to the SOP interface 137. In another such implementation, the SOP interface 137 (or another component included in the system 100) obtains information (for example, landmark information) from a data server by communicating over a public network such as the INTERNET or a public switched telephone network (PSTN). In another implementation, a SOP interface 137 comprises an RF interrogator that communicates with any RF transponders (for example, active and/or passive RF transponders) located with the range of the RF interrogator.

In the particular embodiment shown in FIG. 1, information output by at least one magnetic sensor 106 (for example, bearing information) and information output by at least one altimeter 108 (for example, altitude information) is also input to the Kalman filter 120 for use in generating the navigation confidence 121 and the corrective feedback 123.

The system 100 further comprises a terrain correlator 138. In the embodiment shown in FIG. 1, the terrain correlator 138 is implemented as a part of the software 122 executed by the programmable processor 124. The terrain correlator 138 receives altitude information output by one or more of the altimeters 108 and position information about by the inertial navigation unit 110. The altitude information comprises, for example, an absolute altitude measurement, a relative altitude measurement (for example, relative to ground level), an altitude change, and/or an altitude gradient. In other embodiments and implementations, the altitude information comprises additional or alternative altitude information. The terrain correlator 138 uses the received altitude-information and position information to derive terrain-correlation information (for example, position information) by comparing at least a portion of the received altitude information to at least a portion of reference terrain information 133 (also referred to here as a "reference terrain map" or just "terrain map"). In one implementation of such an embodiment, the terrain correlator 138 implements a minimum absolute differences (MAD) algorithm in which a set of altitude measurements from one or more altimeters 108 are compared to a reference map in order to generate three-dimensional position error information.

In the embodiment shown in FIG. 1, the position error information generated by the terrain correlator 138 is output to the Kalman filter 120 for use in generating the corrective feedback 123. For example, in environments where the GPS/DGPS receiver 134 is unable to receive any GPS RF signals, the position error information output by the terrain correlator 138 is used by the Kalman filter 120 to generate corrective feedback 123 that is used by the inertial navigation unit 110 to control navigation error growth. In other embodiments, the output of the terrain correlator 138 is used in other ways.

In the embodiment shown in FIG. 1, the various inputs to the Kalman filter 120 are pre-processed by an input preprocessor 140 and a measurement prefilter 142. In such an embodiment, the input preprocessor 140 and measurement prefilter 142 are implemented as a part of the software 122 executed by the programmable processor 124. The input preprocessor 140 receives the input information from the various sensors 102 and interfaces 132 and translates the received information from the measurement frame of reference of the information source to the navigation frame of reference of the system 100. The measurement prefilter 142 performs various "reasonability" tests on the received information in order to filter out any input information that fails any of the reasonability tests. In the embodiment shown in FIG. 1, the measurement prefilter 142 uses, for example, human model and user state information 144 in performing such reasonability tests. In other embodiments, the inputs to the Kalman filter 120 are pre-processed in other ways.

In operation, the system 100 is mounted to a user (for example, by placing the system 100 in a backpack that is worn by the user). Initial information (for example, initial absolute position information) is input to or otherwise received by the system 100 (for example, by having the user input such information via the user interface 136 and/or by using the GPS/DGPS receiver 134 to determine an initial position estimate). As the user moves, the inertial navigation unit 110, based on the information supplied by one or more of the inertial sensors 104 and any corrective feedback 123 output by the Kalman filter 120, generates a navigation solution 112.

The Kalman filter 120, in the embodiment shown in FIG. 1, uses any available navigation information provided by the sensors 102 and/or the interfaces 132 to generate the navigation confidence 121 and the corrective feedback 123. The measurement prefilter 142 filters out any navigation information received from the sensors 102 and/or the interfaces 132 that does not meet one or more reasonableness tests (for example, due to environmental factors such as jamming, an obstructed view of the sky, the unavailability of user input or a signal of opportunity and/or a malfunctioning component) while allowing any received information that meets such reasonableness tests to be used in the processing performed by the Kalman filter 120. In this way, the Kalman filter 120 uses all "reasonable" navigation information that is available. In one implementation of such an embodiment, the navigation confidence 121 output by the Kalman filter 120 is a function of the particular types of received navigation information used by the Kalman filter 120 (in addition the content of such information).

In the embodiment shown in FIG. 1, at least a portion of the corrective feedback 123 output by the Kalman filter 120 is used to refine the processing performed by the inertial navigation unit 110, the motion classifier 130, the terrain correlator 138, and the input preprocessor 140 in order to reduce navigation error growth. In FIG. 1, the same corrective feedback 123 is shown, for the sake of clarity, as being supplied to the inertial navigation unit 110, the motion classifier 130, the terrain correlator 138, and the input preprocessor 140, though it is to be understood that in some implementations different types and formats of corrective feedback 123 are supplied to different parts of the system 100.

Figure 2:
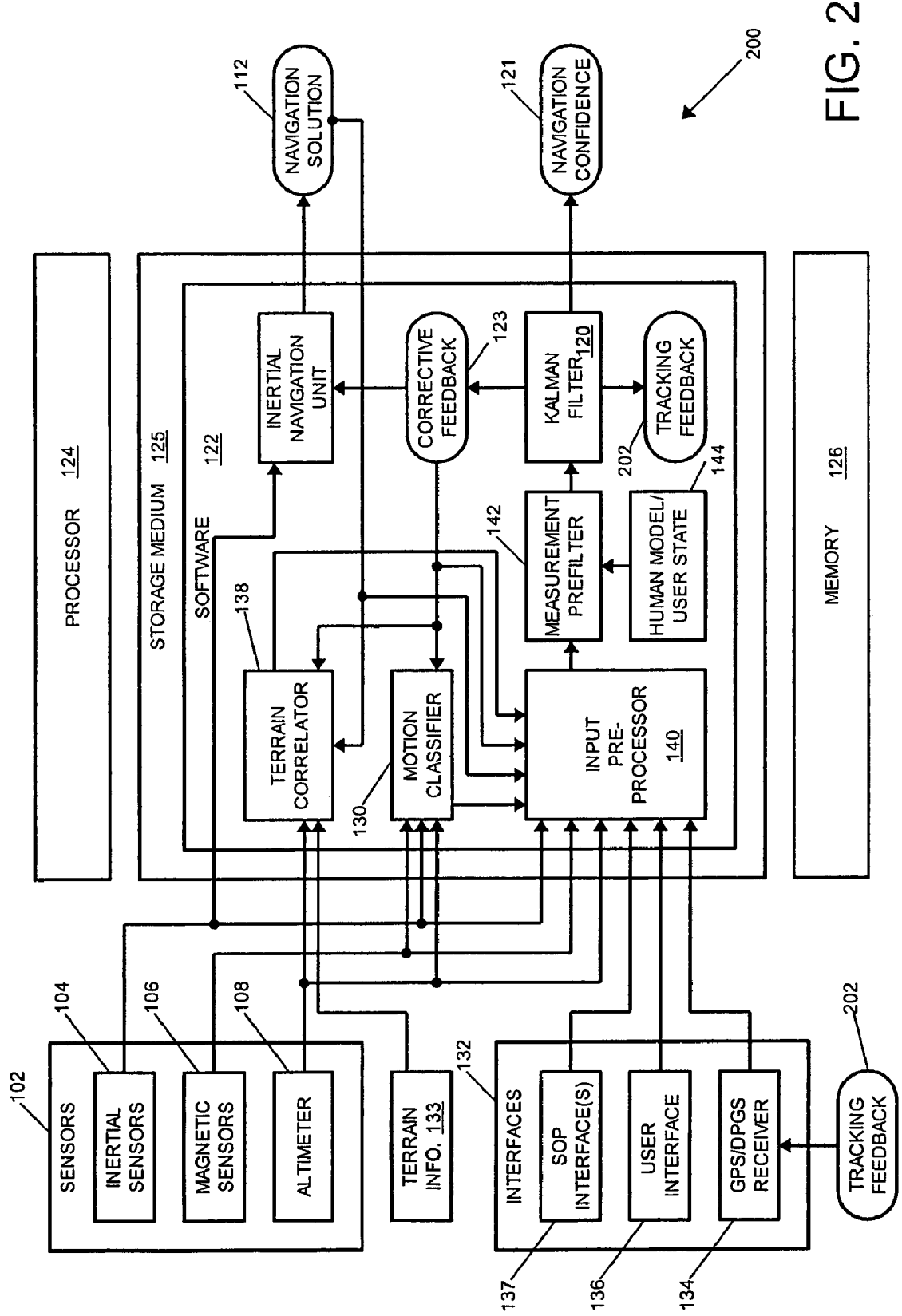
FIG. 2 is a block diagram of one embodiment of a navigation system.

FIG. 2 is a block diagram of another exemplary embodiment of a navigation system 200. The navigation system 200 of FIG. 2 is similar to the navigation system 100 of FIG. 1 and components and similar components and functionality are referenced in FIG. 2 using the same reference numerals used in FIG. 1. In the embodiment shown in FIG. 2, the GPS/DGPS receiver 134 and the inertial navigation unit 110 (and the Kalman filter 120) are "ultra-tightly coupled." The GPS/DGPS receiver 134 provides to the Kalman filter 120 "raw" in-phase and quadrature (I & Q) information for each GPS RF signal that the receiver 134 is able to receive (regardless of whether the receiver 134 is able to receive four, less than four, or more than four GPS RF signals). The I & Q information is provided from the receiver 134 to the Kalman filter 120 via the input preprocessor 140 and the measurement prefilter 142. The Kalman filter 120 uses such I & Q information in the processing performed by the Kalman filter 120 (for example, in generating the navigation confidence 121 and the corrective feedback 123). Also, in the embodiment shown in FIG. 2, the Kalman filter 120 generates feedback 202 (also referred to here as "tracking feedback" 202) for use in optimizing one or more tracking loops included in the GPS/DGPS receiver 134.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A navigation system comprising:
  a plurality of sensors, wherein each sensor outputs sensor information, wherein the sensor information comprises altitude information;
  an inertial navigation unit communicatively coupled to at least one of the plurality of sensors to generate a navigation solution based on at least a portion of the sensor information;
  a motion classifier communicatively coupled to at least one of the plurality of sensors, wherein the motion classifier generates position information based on at least a portion of the sensor information;
  a signal-of-opportunity interface to receive at least one signal of opportunity and to generate signal-of-opportunity information based on the signal of opportunity;
  a Kalman filter communicatively coupled to the inertial navigation unit, the motion classifier, and the signal-of-opportunity interface, wherein the Kalman filter generates corrective feedback as a function of the navigation solution and, when available, at least one of the following: at least a portion of the sensor information, the position information output, and the signal-of-opportunity information;
  wherein the corrective feedback is used by the inertial navigation unit to generate the navigation solution.

2. The navigation system of claim 1, wherein the signal of opportunity comprises at least one of a broadcast television signal, a broadcast radio signal, a data networking signal, and an interference signal.

3. The navigation system of claim 1, further comprising at least one of:
  a global positioning satellite receiver to receive at least one global positioning satellite radio frequency signal, wherein the global positioning satellite receiver is communicatively coupled to the Kalman filter;
  a differential global positioning satellite receiver to receive at least one global positioning satellite radio frequency signal, wherein the differential global positioning satellite receiver is communicatively coupled to the Kalman filter;
  a user interface to receive user input, wherein the user interface is communicatively coupled to the Kalman filter; and
  a signal-of-opportunity interface to receive at least one signal of opportunity, wherein the signal-of-opportunity interface is communicatively coupled to the Kalman filter.

4. The navigation system of claim 3, wherein at least one of the global positioning satellite receiver and the differential global positioning satellite receiver is integrated with the inertial navigation unit using loosely coupled integration.

5. The navigation system of claim 3, wherein at least one of the global positioning satellite receiver and the differential global positioning satellite receiver is integrated with the inertial navigation unit using tightly coupled integration.

6. The navigation system of claim 3, wherein at least one of the global positioning satellite receiver and the differential global positioning satellite receiver is integrated with the inertial navigation unit using ultra-tightly coupled integration.

7. The navigation system of claim 1, further comprising a terrain correlator that generates terrain-correlation information based on the altitude information.

8. The navigation system of claim 7, wherein the Kalman filter generates corrective feedback as a function of the navigation solution and, when available, at least one of the following: at least a portion of the sensor information, the position information, the signal-of-opportunity information, and the terrain-correlation information.

9. The navigation system of claim 7, wherein the terrain-correlation information comprises position error information.

10. The navigation system of claim 7, wherein the terrain correlator generates the terrain-correlation information based on the navigation solution.

11. The navigation system of claim 7, wherein the terrain correlator implements a minimum absolute differences algorithm to generate the terrain-correlation information.

12. The navigation system of claim 1, wherein the altitude information comprises at least one of: absolute altitude information, relative altitude information, altitude change information, and altitude gradient information.

13. A method comprising:
  receiving sensor information about a plurality of physical attributes associated with a navigation system, wherein the sensor information comprises altitude information about an altitude attribute associated with the navigation system;
  generating an inertial navigation solution based on at least a portion of the sensor information;
  classifying a motion based on at least a portion of the sensor information in order to generate position information;
  receiving at least one signal of opportunity and generating signal-of-opportunity information based on the signal of opportunity;
  using a Kalman filter to generate corrective feedback as a function of the navigation solution and, when available, at least one of the following: at least a portion of the sensor information, the position information, and the signal-of-opportunity information;
  using the corrective feedback to generate the navigation solution.

14. The method of claim 13, further comprising correlating the altitude information with reference terrain information in order to generate terrain-correlation information.

15. The method of claim 14, wherein using the Kalman filter to generate corrective feedback as a function of the navigation solution and, when available, at least one of the following: at least a portion of the sensor information, the position information, and the signal-of-opportunity information comprises using the Kalman filter to generate corrective feedback as a function of the navigation solution and, when available, at least one of the following: at least a portion of the sensor information, the position information, the signal-of-opportunity information, and the terrain-correlation information.

16. Apparatus comprising:
 means for receiving sensor information about a plurality of physical attributes associated with a navigation system, wherein the sensor information comprises altitude information about an altitude attribute associated with the navigation system;
 means for generating an inertial navigation solution based on at least a portion of the sensor information;
 means for classifying a motion based on at least a portion of the sensor information in order to generate position information;
 means for receiving at least one signal of opportunity and generating signal-of-opportunity information based on the signal of opportunity;
 means for using a Kalman filter to generate corrective feedback as a function of the navigation solution and, when available, at least one of the following: at least a portion of the sensor information, the position information, and the signal-of-opportunity information;
 means for using the corrective feedback to generate the navigation solution.

17. A software product comprising a processor-readable storage medium on which software is embodidied, the software comprising a plurality of program instructions operable to cause a processor to:
 receive sensor information output by a plurality of sensors, wherein the sensor information comprises altitude information;
 generate an inertial navigation solution based on at least a portion of the sensor information;
 classify a motion based on at least a portion of the sensor information in order to generate position information;
 receive signal-of-opportunity information from a signal-of-opportunity information that receives a signal of opportunity;
 use a Kalman filter to generate corrective feedback as a function of the navigation solution and, when available, at least one of the following: at least a portion of the sensor information, the position information, and the signal-of-opportunity information;
 use the corrective feedback to generate the navigation solution.

* * * * *